United States Patent [19]
Belser

[11] Patent Number: 6,021,463
[45] Date of Patent: *Feb. 1, 2000

[54] METHOD AND MEANS FOR EFFICIENTLY MANAGING UPDATE WRITES AND FAULT TOLERANCE IN REDUNDANCY GROUPS OF ADDRESSABLE ECC-CODED SECTORS IN A DASD STORAGE SUBSYSTEM

[75] Inventor: Karl Arnold Belser, San Jose, Calif.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/922,102

[22] Filed: Sep. 2, 1997

[51] Int. Cl.[7] .................................................. G06F 12/16
[52] U.S. Cl. ........................... 711/114; 711/155; 711/161; 707/204; 714/6
[58] Field of Search .................................... 711/113, 114, 711/117, 118, 143, 144, 145, 155, 136, 134, 160, 161, 162; 395/182.04; 714/6

[56] References Cited

U.S. PATENT DOCUMENTS

| | | | |
|---|---|---|---|
| 4,916,605 | 4/1990 | Beardsley et al. ......................... | 395/489 |
| 5,333,143 | 7/1994 | Blaum et al. ........................... | 371/40.4 |
| 5,341,493 | 8/1994 | Yanai et al. ............................. | 711/161 |
| 5,377,342 | 12/1994 | Sakai et al. ............................. | 711/161 |
| 5,537,567 | 7/1996 | Galbraith et al. ....................... | 711/114 |
| 5,596,709 | 1/1997 | Bond et al. ......................... | 395/182.05 |
| 5,634,109 | 5/1997 | Chen et al. ............................. | 711/143 |
| 5,651,132 | 7/1997 | Honda et al. ........................... | 711/114 |
| 5,734,813 | 3/1998 | Yamamoto et al. ............... | 395/182.04 |

*Primary Examiner*—Eddie P. Chan
*Assistant Examiner*—Hiep T. Nguyen
*Attorney, Agent, or Firm*—R. Bruce Brodie; G. Marlin Knight

[57] ABSTRACT

In a subsystem for accessing addressable ECC-coded sectors of magnetic disk tracks subject to sector level redundancy group organization, a method is described for managing write updates to said sectors by maintaining a current set of all redundant sectors in a subsystem NVS buffer external to the DASD such that only a read access of the DASD sector to be modified need be made. This derives from the availability of the new record data and the old redundant sector information at the subsystem. The redundant sector is modified by logically combining the old redundant sector and the new and old data sectors and is saved to the buffer and asynchronously copied to DASD subsequently.

6 Claims, 2 Drawing Sheets

METHOD AND MEANS FOR EFFICIENTLY MANAGING UPDATE WRITES AND FAULT TOLERANCE IN REDUNDANCY GROUPS OF ADDRESSABLE ECC-CODED SECTORS IN A DASD STORAGE SUBSYSTEM

FIELD OF THE INVENTION

This invention relates to storage subsystems attaching at least one direct access storage device (DASD), and more particularly to reducing the write penalty associated with update writes of a logical association of addressable units of storage and a redundant unit where the unit of storage is an addressable ECC-coded sector of track and the redundant unit is the logical combination of n sectors into a finite Galois GF(2) field.

DESCRIPTION OF RELATED ART

The following paragraphs start with a brief description of the dynamics of a staged storage subsystem's response to read and write requests made by applications executing on an attached CPU. Current systems read and write to addressable ECC-coded sectors of tracks stored eventually on high-density DASD. However, when errors or erasures exceed the capacity of the sector level ECC, the prior art teaches that sectors in error may be reconstructed using a second level ECC. This leads to the problem addressed in this specification; namely, how to efficiently manage the so-called write penalty arising out of the write updating in DASD of stored data operating under ECC and redundant sector level protection schemes.

Units of Data and Units of Storage

It should be noted that applications executing on CPUs and their operating system counterparts read and write to memory in units of data such as the variable or fixed-length record and data sets. In this context, data is interpretable and meaningful information strings. In contrast, storage subsystems and their management treat recorded data in units of storage such as sector, track, and volume as uninterpreted strings.

CPU Accessing Staged Storage

When an application runs on a multiprocessing CPU, such as an IBM S/390 with an MVS operating system, it will generate read or write calls for data to the operating system (OS). If the data is not present in CPU main memory, the OS will invoke an access method and establish a path to the data. The path will lead to data stored or to be written on one or more DASDs in an attached storage subsystem. The storage subsystem may be of the demand/responsive hierarchically-organized storage type. Illustratively, the IBM 3990 Model 6 storage control unit (SCU) is of that type. It includes a large multimegabyte cache, a nonvolatile store (NVS), and several redundant pathways to each of a plurality of 3390 DASDs or their equivalents.

If the application running on the S/390 has generated a read request, then the data would likely be stored in the SCU cache and transferred to main memory. Alternatively, if not in SCU cache, the read data would be staged to cache from one or more DASDs. It would then be copied to CPU main memory. In the case of an application-generated write, the changed or updated data would be moved from host CPU main memory to the SCU cache. It would then be copied over to a nonvolatile store (NVS). This would permit the SCU to signal completion of the write operation and release the path coupling the SCU to the CPU. At a time subsequent, the data can be written out to the DASDs from NVS.

Aspects of the Physical and Logical Organization of Disk Storage

A direct access storage device (DASD) or disk drive comprises at least one rotating disk covered with a magnetic coating which can store magnetic or electronic data and an apparatus for reading data from and writing data to that disk. This is implemented by a "spindle motor" to rotate the disk or disks, at least one "read/write head" to read and write data to and from the disk or disks, an "actuator" to position the read/write head or heads radially over the disk or disks either on a linear or rotary basis, and a "data channel" to transfer information between the read/write head or heads and an accessing source.

Information is recorded on the disk along concentric tracks divided into sectors. Years ago, all the tracks had the same number of bytes recorded thereon. This meant that the recording density per track varied inversely with radial distance. Today, the recording practice and the capacity have changed such that groups of concentric tracks form a zone and have data recorded at a density (bytes/track inch) that is constant. Thus, the tracks in the outer zones will have more information recorded thereon than those on the inner zones.

The sectors on each track are each operable on a unit of addressable storage. In the industry, each addressable sector consists of 512 bytes. Each sector includes redundant bytes that aid in the detection and correction of error up to some fixed limit. Whenever an error or erasure exceeds the capacity of the sector level code, then additional measures are needed to recover.

It is also desirable to superimpose additional associations among the units of storage, either to assist in rapid accessing or to enhance the active or passive protection of the data. These additional associations are termed collectively as "logical views" of storage. One construct can be formed from a logical association of an arbitrary set of n same-size storage units and a redundancy unit derived therefrom. In the case of error or erasure beyond the ECC capacity for that sector, data on that sector would be unavailable. However, it can be reconstructed by logically combining the remaining n−1 sectors with the redundant sector of that group.

ECC-coded Sectors

As Hassner et al., U.S. Ser. No. 08/896,348, filed Jul. 18, 1997, explained, an error correction code of the Reed-Solomon (RS) type is one in which every codeword $c(z)$ in an (n, k) linear cyclic code over $GF(2m)$ is generated by dividing a block of data $m(z)$ by a generator polynomial $g(z)$. Relatedly, $c(z)$ is a polynomial of degree n−1 or less, where $m(z)=m0+m1\times1+m2\times2+ \ldots +m(n-r-1)\times(n-r-1)$, and where $g(z)=g0+g1\times1+g2\times2+ \ldots +gr\times r$, such that $c(z)=m(z)/g(z)+$remainder. It should be recalled that codewords are conventionally represented as a collection of coefficients of a rational polynomial of an arbitrary place variable z in low to high order.

Significantly, a received or read back codeword $r(z)=c(z)+e(z)$ where $c(z)$ was the codeword originally transmitted or recorded and $e(z)$ is the error. Relatedly, a syndrome polynomial $S(z)$ is informally defined as $S(z)=r(z) \bmod g(z)$. Thus, $r(z)=c(z)$ if and only if $g(z)$ divides into $r(z)$ with a remainder of zero, i.e., $S(z)=0$. Otherwise, it can be shown that $S(z)$ is dependent only on the error function $e(z)$ such that $S(z)=e(z) \bmod g(z)$.

The current trend in storage subsystem design is to access units of storage of fixed size. Many, if not most, systems in magnetic storage use addressable sectors of track of $m(z)=$ 512 bytes in length. Also, error detection and correction at the track sector level is done on the fly at the DASD whenever a sector is read back from a disk track. This imposes a severe time constraint as to the number of errors and erasures that can be processed. Current systems are limited to processing three to five bytes in error or erasure per readback sector r(z).

Addressable Sectors, Redundancy Groups, Correctable and Uncorrectable Error

Belser et al., U.S. Ser. No. 08/450,123, filed May 25, 1995, discloses the use of an additional level of recovery when error or erasure of a track sector is beyond the capability of the sector level ECC. In most DASDs, sector level error or erasure is detected upon reading the sector and detecting nonzero syndromes. If the errors or erasures are within the resolving power of the code, they are processed and corrected. If they are uncorrectable, then an interrupt or equivalent is set noting the address of the current sector being read.

In Belser, each redundancy group is formed from the data contents of a set of n associated addressable sectors plus a redundant sector. The association can be quite arbitrary or it can be based on performance factors such as all the sectors in several contiguous tracks. The redundant sector is derived from logically XORing the n sector contents. The redundant sector also includes a list of sectors and it is stored separately on the disk. Since the location of an unrecoverable sector is known from the sector level ECC processing, the contents of any unavailable single sector can be recovered on either a scheduled or opportunistic basis by logically combining the remaining n−1 error-free sectors and the redundant sector of the redundancy group. This second level of recovery is predicated on the statistical assumption that the likelihood of an error obliterating more than one sector is extremely small. The redundancy group can be formed from the recorded contents or on any other basis.

Redundancy Groups, Update Write, and the Write Penalty

Applications executing on CPU hosts are frequently updating the data as recorded in the DASD sectors associated therewith. If an application desired to change or otherwise modify a particular record, it would be efficient if only the affected sectors of a redundancy group had to be staged up to the control unit rather than all sectors. It is well appreciated in the prior art that an update write of a record requires at least four DASD access operations. These include (1) reading the contents of the sector containing the record or records to be modified, (2) reading the contents of a redundant sector of the group, (3) writing out the rewritten contents of the data sector in place, and (4) writing out the modified contents of the redundant sector in place. The four operations are collectively termed the "write penalty".

SUMMARY OF THE INVENTION

It is accordingly an object of this invention to devise a method and means for efficiently processing write updates while preserving fault tolerance in addressable ECC-coded sector- or track-organized redundancy groups in a storage subsystem having at least one DASD.

It is a related object that such method and means operably take into account when the subsystem is subject to scheduled or unscheduled power shutdowns.

It was unexpectedly observed that advantage could be taken of the fact that a redundant sector of a group could be buffered within the storage subsystem and asynchronously written out to DASD after it had been updated. If the number of groups were modest, then all or a large fraction of the redundant sectors of all of the groups could be maintained in a dedicated cache or buffer at the subsystem separate from other caches and buffers. This availability would substantially reduce the DASD staging in a cache-based DASD subsystem for accessing addressable ECC-coded sectors of magnetic disk tracks subject to sector level redundancy group organization.

More particularly, the method and means of the invention manage write updates to the records by maintaining a current set of all redundant sectors in a subsystem NVS buffer external to the DASD. In order to complete the update write, it was the prevailing practice to use two read accesses and two write accesses. This invention modifies the four-access write penalty such that only a read access need be made to the DASD track containing the sector to be modified. This devolves from the fact that the new sector data and the old redundant sector information are available at the subsystem and do not require staging. Each redundant sector is conveniently modified by logically combining the old redundant sector and the new and old data sectors, and then saving the new redundant sector to NVS and the track as now updated. The host can be notified of a write complete. Lastly, both the redundant sector and the modified data tracks can now be asynchronously copied to DASD.

The size and number of redundancy groups is a matter of design choice. However, if it is desired to minimize the subsystem NVS cache or buffer retaining the current copy thereof, then the redundancy group may include or span all sectors in contiguous tracks within a zone. If greater fault tolerance is desired, then this would indicate the need for a larger number of small groups. Additional tolerance is afforded by the degree of scatter of the sectors forming the group over the disk.

DESCRIPTION OF THE PREFERRED EMBODIMENT

Figure 1:
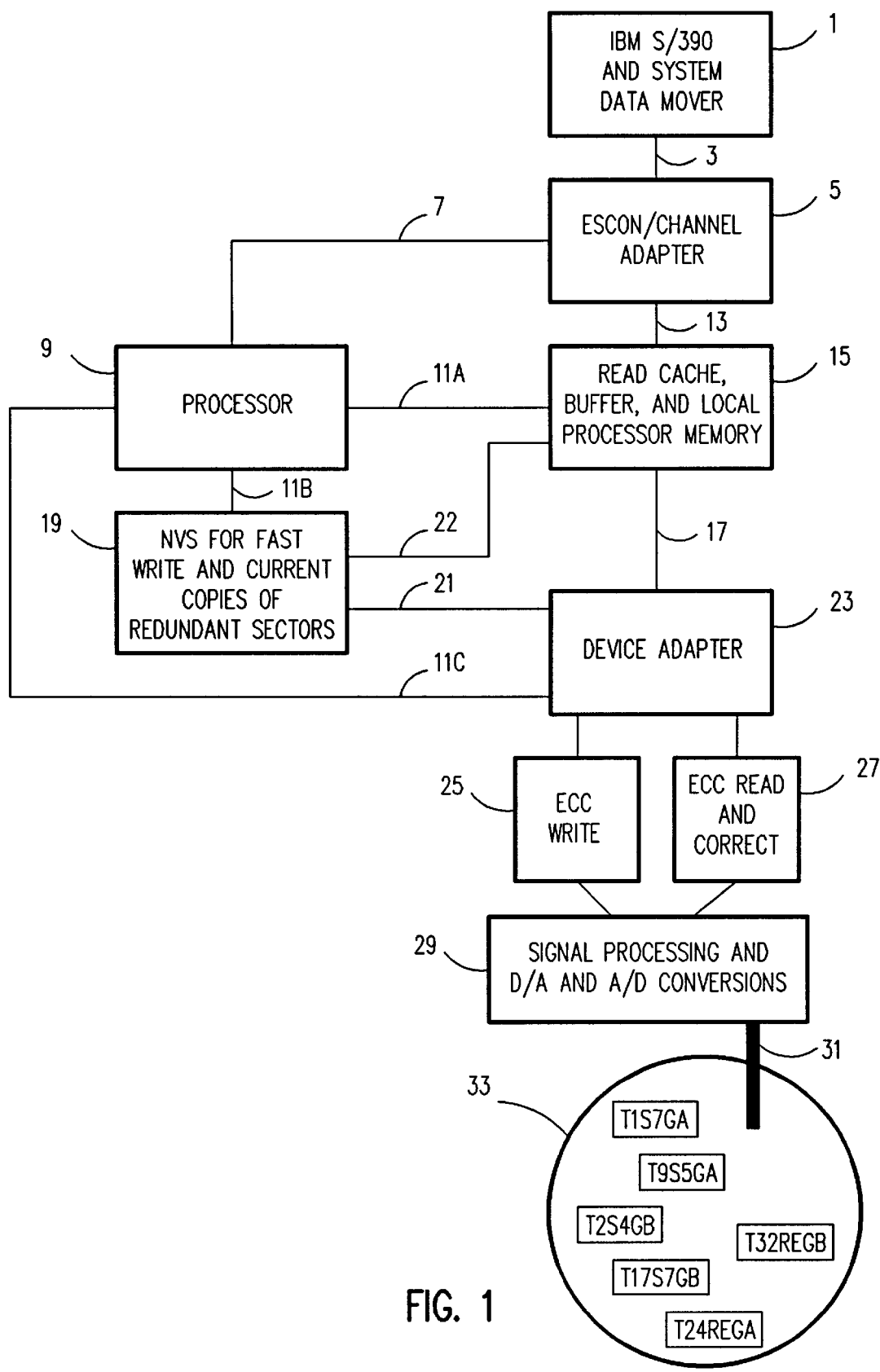
FIG. 1 is a block diagram of a hierarchically-managed, staged DASD storage subsystem using the write update management according to the invention.

Referring now to FIG. 1, there is shown a block diagram of a hierarchically-managed, staged DASD storage subsystem using the write update management according to the invention. A read or write access request for certain records originates with an application (not shown) executing on a computer, such as an IBM S/390 multiprocessing, multiprogramming CPU 1. The read or write request is passed to the access method portion of the operating system, such as the virtual storage access method (VSAM). The access method via a system data mover sends access commands and logical addresses to the subsystem over a path 3 to a subsystem processor 9 via a general interface attachment 5 and a connecting path 7. The processor 5 in turn interprets the commands and causes the logical addresses to be mapped into DASD storage track and sector addresses by way of table lookup or computation based on catalogs and directories located in the large reading cache, local buffer, and memory 15. Usual practice includes directory and catalog maps to be staged from the DASD to the cache as part of the subsystem boot-up operation.

The processor 9 consists of one or more processors exemplified by the Intel Pentium for managing the storage subsystem functions. Usually, many of the time-critical essential processor functions include in-line code available to it in the form of internal ROMs. Furthermore, the processor receives access commands and addresses from the host 1 via adapter 5 and path 7. The processor 9 is coupled to a dedicated portion of very high-speed volatile memory 15 over path 11A to a nonvolatile store (NVS) 19 over path 11B and to a device adapter or interface 23 via path 11C.

The random access memory 15 is configured so that one part is operated by the processor 9 as an LRU track read cache. Another part of the memory 15 stores indicia of the current state of the system, task progress data, address mapping information and the like. Yet another portion of the memory 15 operates as a working buffer where logical operations may be performed on sectors and tracks of data.

The NVS 19 can be fashioned from battery-backed RAM or the like. It is coupled to the cache 15 via path 22 and to the device adapter 23 over path 21. The processor 9 operates the RAM 15 as a failure-independent and dedicated memory medium. This includes effectuating a fast write operation. That is, it is used to store updated sectors or tracks that can be asynchronously written out to DASD. Thus, Beardsley et al. U.S. Pat. No. 4,916,605, "Fast Write Operations", issued Apr. 10, 1990, described the use of an NVS by which a host could be given signal indication that a write update had been completed when a modified sector or equivalent was written in to the NVS. This increases the host application throughput since it reduces the write path delay.

In this invention, the NVS 19 stores the redundant sectors on an updated basis. The maintenance and availability of the redundant sectors in a failure-independent cache or buffer such as the NVS at the subsystem is critical to reducing or eliminating at least one of the four accessing operations per update write.

The device adapter 23 provides the necessary logical controls to provide a write path from the NVS 19 over conduit 21 through the ECC encoder 25. The ECC write encoder 25 maps a 512-byte sector into an appropriate Reed-Solomon codeword. This RS codeword is in turn applied to a signal processing and signal conversion logic 29. A servo path for positioning the arm, suspension, and slider 31 over the rotating disk 33 is not shown but is readily appreciated by one skilled in this art. The signal conversion logic 29 also maps the codewords into an appropriate channel code to spectrally match the magnetic recording environment. It also ultimately generates a time-varying waveform that is actually recorded on the disk 33 at the designated track and sector address.

Also depicted on disk 33 are addressable sectors distributed in an arbitrary manner which form different redundancy groups. One advantage to different spatial distribution of the sectors of a group over the tracked surface of a magnetic disk is that it should improve fault tolerance. That is, the likelihood that an error or erasure would be so large as to affect two or more sectors of the same group is vanishingly small. Certainly, the spatial distribution can be matched to the access patterns. It may very well be the case that a distribution can be selected from the set consisting of a uniform, normal, Poisson, hypergeometric, or Chi-square.

As may be recalled, contemporary disk recording practice is to arrange a set of contiguous tracks into zones where the bytes per track are the same for those within the zone. One distribution that is operationally desirable is to record all the sectors of a redundancy group, including the redundant sector, to lie within the same zone. However, the redundant sector should be recorded in a separate part of the zone. Indeed, if several groups are recorded in the same zone, then the redundant sectors can be recorded in a dedicated part of the zone.

Referring again to FIG. 1, it is the practice to detect and correct the error state of a sector upon its being read on-the-fly from the disk 33. To this extent, a sector or track, upon being read, is passed through logic 29 and converted into an ECC-coded 512-byte stream at a time and processed by ECC read and correct logic 27. If any detected errors are correctable, they are so computed and the resultant passed through the device adapter 23 and staged to cache 15. If they are not correctable, the sector or track can be reread a predetermined number of times after which an interrupt is set in the processor 9. This causes the processor to effectuate an error recovery procedure such as to reposition the head over the track or recover using the XORing n−1 data sectors plus the redundant sector of the group.

Figure 2:
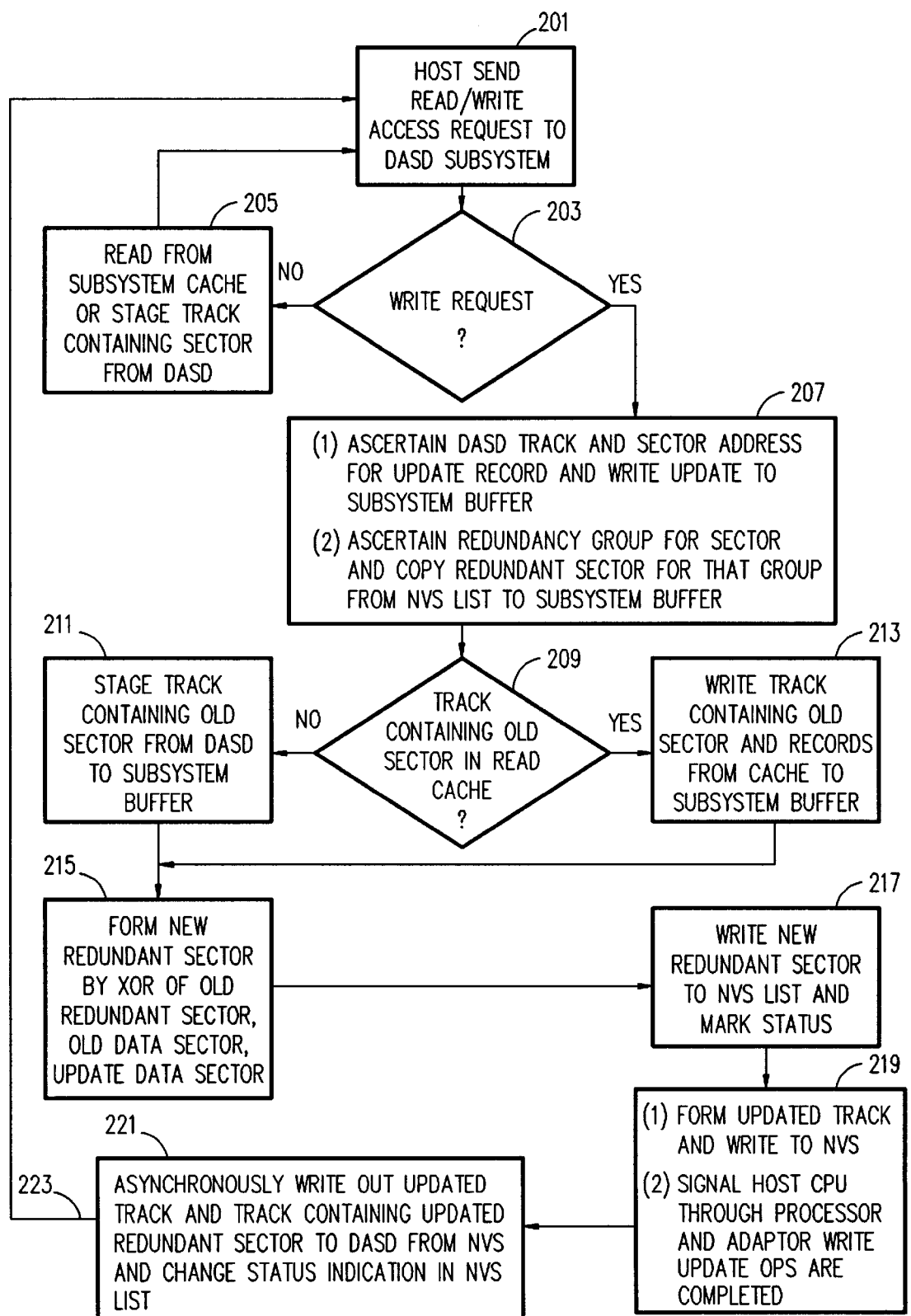
FIG. 2 depicts the flow of control of the method and means of the invention.

Referring now to FIG. 2, there is shown the flow of control of the method and means of the invention. The method is initiated in step 201 with the sending of an access request from the host top of the subsystem. It is tested in step 203 to determine if it is a write update. If it is a read request, then step 205 provides that the sector is either read from subsystem cache or staged to cache and then read by the host.

Given that the request is a write update, steps 207 through 213 assure that the redundancy group is identified and that the given addressed sector is staged from DASD to subsystem buffer, and that the redundant sector is copied from NVS to the subsystem buffer as well as the updated sector. Step 215 requires forming the new redundant sector by logically combining via XORing the contents of the subsystem buffer. The new redundant sector is then written to the NVS and its status is marked in step 217. The status marking can be simply a predetermined bit indicating whether the redundant sector has been copied out to DASD. In the event of scheduled power outage, the disk can be updated with those redundant sectors not written out.

Since data is frequently, although not necessarily, staged and destaged to and from DASD and to and from cache by track, step 219 provides forming a track including the updated sector and writing the same to the NVS and indicating write completion to the host CPU. The last step 221 provides for asynchronous writing out the track and/or update sector to the DASD in place. The redundant sector is preferably copied out asynchronously to DASD in place. This means that the NVS will only retain the redundant sectors. As each redundant sector is copied out, its status is marked. The method then resets over path 223 and awaits the next host read or write.

The invention may be extended in two ways. First, the sectors of redundancy groups may be scattered across the disk so as to minimize contiguity and the likelihood that a given length error or erasure would cross boundaries of two or more sectors from the same group. However, in the event that recording density continues to increase on the disk media, the relative size of an error or erasure such as caused by a disk scratch or the like might easily extend across sector boundaries even when spaced apart. In that case, one could use two or more redundant sectors per redundancy group coded according to Blaum et al., U.S. Pat. No. 5,333,143, "Method and Means for B-adjacent Coding and Rebuilding Data from Up to Two Unavailable DASDs in a DASD Array", issued Jul. 26, 1994. This would provide additional robustness to recovery in addition to scattering with minimal impact on the write update processing.

While the invention has been described with respect to an illustrative embodiment thereof, it will be understood that various changes may be made in the method and means herein described without departing from the scope and teaching of the invention. Accordingly, the described embodiment is to be considered merely exemplary and the invention is not to be limited, except as specified in the attached claims.

What is claimed is:

1. In a subsystem for accessing addressable ECC-coded sectors of magnetic disk tracks of a DASD subject to sector level redundancy group organization, a method for managing write updates to said addressable sectors and for maintaining fault tolerance of counterpart redundancy groups, comprising the steps of:

(a) maintaining a current set of all redundant sectors and a concordance of sectors and redundancy groups in a subsystem memory external to the DASD;

(b) responsive to a write update to a given addressed sector, ascertaining the redundancy group to which the given sector is a member, and copying into a subsystem buffer (1) the counterpart redundant sector from the subsystem memory, (2) the given addressed sector into the buffer if present in the subsystem, or if not, staging the given addressed sector from the DASD, and (3) the updated sector; and (c) forming an updated redundant sector by logically combining the redundant sector from the subsystem memory, the given sector, and the updated sector; and (d) copying the updated redundant sector into the subsystem memory and asynchronously writing out the modified sector in place on the DASD disk tracks such that only a read access of the DASD sector to be updated need be made because of the availability of the updated sector and the given redundant sector information at the subsystem.

2. The method according to claim 1, wherein the disk tracks are recorded such that groups of contiguous tracks called zones retain the same byte-per-track capacity for tracks within each zone, the track capacity per zone varies directly with its radial distance from the disk center, addressable sectors, and the redundant sector of the same redundancy group being recorded within the same zone.

3. In a subsystem responsive to external read and write requests and for accessing addressable ECC-coded sectors of disk tracks of a DASD subject to sector level redundancy group organization, said subsystem including means for generating a redundant sector by logically combining the contents of a set of addressable sectors, each redundant sector and counterpart set of addressable sectors being denominated a redundancy group, said generating means including the locations of the sectors of the group in said redundant sector and including means for asynchronously writing out the redundant sector to an available track sector, a method for managing write updates to said records, comprising the steps of:

(a) maintaining a current set of all redundant sectors and a concordance of sectors and redundancy groups in a subsystem nonvolatile store (NVS) external to the DASD;

(b) responsive to an update write request to a given sector, ascertaining the redundancy group to which the given sector is a member and copying into a subsystem buffer the contents of the redundant sector from the NVS the present addressed sector either as available within the subsystem or as staged from the DASD; and (c) forming an updated redundant sector by logically combining the given sector, the updated sector, and the redundant sector from NVS, copying the updated redundant sector to the NVS buffer, and asynchronously writing out the updated sector and the updated redundant sector to the DASD in place.

4. An article of manufacture comprising a machine-readable memory having stored therein a plurality of processor-executable control program steps for managing write updates to addressable ECC-coded sectors and for maintaining counterpart redundancy groups in a subsystem for accessing magnetic disk tracks of a DASD subject to sector level redundancy group organization said plurality of stored, processor-executable control program steps include:

(a) a control program step for maintaining a current set of all redundant sectors and a concordance of sectors and redundancy groups in a subsystem memory external to the DASD;

(b) a control program step responsive to a write update to a given addressed sector for ascertaining the redundancy group to which the given sector is a member, and copying into a subsystem buffer (1) the counterpart redundant sector from the subsystem memory, (2) the addressed sector into the buffer if present in the subsystem or if not, staging the given addressed sector from the DASD, and (3) the updated sector;

(c) a control program step for forming an updated redundant sector by logically combining the redundant sector from the subsystem memory, the given sector and the updated sector; and (d) a control program step for copying the updated redundant sector into the subsystem memory and asynchronously writing out the modified sector in place on the DASD such that only a read access of the DASD sector to be updated need be made because of the availability of the updated sector and the given redundant sector information at the subsystem.

5. In a subsystem for accessing DASD with sector level redundancy group organization, a method for writing updates to addressable sectors, comprising the steps of:

maintaining a current set of all redundant sectors and a concordance of sectors and redundancy groups in a nonvolatile subsystem memory external to the DASD;

responsive to a request to write new data to a given addressed sector containing old data, ascertaining the redundancy group to which the given addressed sector is a member and a counterpart redundant sector in the nonvolatile subsystem memory;

retrieving the old data from a cache or from the DASD;

forming an updated redundant sector by logically combining the redundant sector from the subsystem memory, the old data, and the new data;

storing the updated redundant sector and the new data in the nonvolatile subsystem memory and then signaling a host computer that a write operation has been completed; and asynchronously writing the new data on the DASD disk.

6. A storage subsystem for accessing a DASD with sector level redundancy group organization, comprising:

a nonvolative subsystem memory external to the DASD;

means for maintaining a current set of all redundant sectors and a concordance of sectors and redundancy groups in the nonvolatile subsystem memory;

means responsive to a request to write new data to a given addressed sector containing old data, for ascertaining the redundancy group to which the given addressed sector is a member and a counterpart redundant sector in the nonvolatile subsystem memory;

means for retrieving the old data from a cache or from the DASD;

means for forming an updated redundant sector by logically combining the redundant sector from the subsystem memory, the old data, and the new data;

means for storing the updated redundant sector and the new data in the nonvolatile subsystem memory and then signaling a host computer that a write operation has been completed; and means for asynchronously writing the new data on the DASD disk.

* * * * *